United States Patent Office 3,334,469
Patented Aug. 8, 1967

3,334,469
PROCESS FOR REMOVING HYDROGEN SULFIDE FROM NATURAL GAS
Oskar Deicher, Ehlershausen, Siegfried Peter, Hannover-Buchholz, and Otto Buchholz, Aligse, Germany, assignors, by mesne assignments, to Bernhard Grufer, Zurich, Switzerland
No Drawing. Filed Feb. 18, 1964, Ser. No. 345,588
Claims priority, application Germany, Oct. 14, 1963, P 32,771
12 Claims. (Cl. 55—44)

The present invention relates to a process for the selective removal of hydrogen sulfide from gases, especially from natural gases, which are under a high pressure and in addition to hydrocarbons and hydrogen sulfide may contain further constituents such as nitrogen, carbon dioxide, carbon oxysulfide, mercaptans, etc.

Natural gas occurrences are known which contain up to about 20% by volume, in individual instances over 20% by volume, of hydrogen sulfide. For the transmission and treatment of that kind of gas the high content of hydrogen sulfide is most troublesome so that it is removed from the gas and must be obtained in a suitable concentration for its further working, especially in a Claus unit. For the desulfurizing of such gas various processes are known; wet desulfurizing processes are preferably used which can be carried out as hot regenerating or pressure wash processes. The pressure wash processes generally work better than the hot regenerating processes and are also considered better in economic respects when the gas to be purified is under high pressure as is the case in natural gases.

The process according to the invention is now carried out in the manner that a trialkylphosphoric acid ester is used as washing medium whereupon the washing medium is regenerated by simple pressure release in one or more stages and/or after pressure release partially or wholly (each time according to the desired degree of purity of the pure gas) thermally, if necessary under stripping with an inert or pure gas, the thus purified gas being desulfurized to a low hydrogen sulfide content of the order of 2 p.p.m. by volume.

The thermal regeneration is suitably carried out at a temperature of 50° C. to 150° C., preferably at 100° C. The pressure wash takes place preferably at 40 to 80 atmospheres excess pressure and at room temperature or slightly above, for example up to 35° C. or 40° C.

The phosphoric acid esters used according to the invention are readily prepared from phosphorus oxychloride and the corresponding alcohol by several procedures. [See, for example, Org. Synth. Coll., vol. II (1943), German Patent 541,145 (1927), German Patent 564,321 (1928), German Patent 632,570 (1934), United States Patent 2,008,478 (1934) and United States Patent 2,410,118 (1944).] They are characterized in that they have sufficiently great selective solubility for hydrogen sulfide for the economic carrying out of the washing, possess sufficiently great stability for normal operating conditions, are of such low viscosity that they can be pumped around without excessively great energy expenditure in the circulation system, have such low specific vapor pressure that there are only small solvent losses due to the process and they permit extensive freeing of the dissolved gases by a simple pressure release in one or more stages. Especially suitable solvents are the lower trialkylphosphoric acid esters such as trimethylphosphate, triethylphosphate, tri-n-propylphosphate, tri-isopropylphosphate, tri-n-butylphosphate, tri-isobutylphosphate, tri-sec.-butylphosphate and tri-amylphosphate. Of these tri-n-butylphosphate and tri-n-propylphosphate are especially preferred since under the conditions of the gas washing they are very stable, are of low viscosity and at the washing temperature with a $10^{-2}$ or $10^{-1}$ Torricelli vacuum have such low vapor pressure that solvent losses without further technical expediture remain very slight.

Acid natural gases always contain as a rule a fixed proportion of mercaptans. There are known instances in which the mercaptan content amounts to several percent. The known processes remove the mercaptans not at all or only incompletely, or these processes are no longer capable of being carried out economically at high mercaptan contents on account of the formation of troublesome compounds from the washing medium and organic sulfur compounds. The process according to the invention removes even higher contents of mercaptans completely since the alkyl phosphoric acid esters have a good solvent capacity for organic sulfur compounds, thus, for example, 100 grams of tri-n-butylphosphate dissolve about 35 grams of ethyl mercaptan at 40° C.

The exact conditions, under which the pressure wash is operated, especially the proportion of the quantity of washing medium, are dependent on the desired degree of purity of the pure gas which is to be regenerated thermally and/or by stripping with inert or pure gas. This permits, for example, a gas with a hydrogen sulfide content of 15% by volume to be desulfurized to a hydrogen sulfide content of 0.2% by volume when about 50% of the circulating amount of washing medium is regenerated thermally at 100° C. and thereby to be stripped with a pure gas quantity which takes out approximately the 25th part of the amount of crude gas put in. If an extensive removal of hydrogen sulfide about up to 4 p.p.m. is desired, a fine purification according to the usual fine purification processes can be added. It is however also possible to reduce the sulfur content of the pure gas to 4 p.p.m. by suitable mode of action in the washing medium regenerating, such as increasing the amount of stripping gas, raising the regenerating temperature, etc. with the aid of a wash according to this process.

The process according to the invention in contrast with known processes which use water or an aqueous solvent as the washing medium has the advantage that substantially less corrosion effects occur. A further advantage thereby arises that the fine regenerating of the washing medium can take place thermally and need not be carried out with a vacuum device as in the use of water as washing medium. In using water, thermal regenerating is not possible since the corrosion difficulties are thereby too great. However, even in a vacuum regenerating the process according to the present invention has the advantage of the process which uses water or watery solvents because the gas set free in the regenerating is dry and for that reason less occasion for corrosion arises. In connection with a fine purification it is however also possible to limit it to regeneration of the washing medium by mere pressure release.

The invention is illustrated by the following non-limitative examples in which Nm.³/h. means cubic meters per hour at 0° C. and 760 mm. Hg.

*Example 1*

25,000 Nm.³/h. of dried crude gas under a pressure of 60 atmospheres excess pressure with 15% by volume of hydrogen sulfide, 69% by volume of methane and 10% by volume of carbon dioxide and the remainder nitrogen were introduced into the bottom of a washing tower which is partitioned by a plurality of diaphragms and washed in countercurrent relationship at a pressure of 60 atmospheres excess pressure and a temperature of preferably 20° C. to 40° C. with 45 cubic meters per hour of tri-n-butylphosphate of which one-half was subjected to fine regeneration by heating to 100° C. and stripping with 1,000 Nm.³/h. of pure gas and fed to the top and the other half was fed into the middle portion of the column and thus freed of hydrogen sulfide up to a residual content of 0.2% by volume (2 p.p.m.). The thus pre-purified gas can be desulfurized up to a hydrogen sulfide content of 4 p.p.m. in an added fine purification by being conducted for example through a bed of molecular sieve Type 5A (pore diameter 5 A.).

The loaded washing medium is subjected to pressure release to atmospheric pressure in a pressure release column. The thereby resulting pressure released gas contains about 79% by volume of hydrogen sulfide, 8% by volume of carbon dioxide and 13% by volume of methane and can be subjected to subsequent processing to sulfur in a Claus unit in the usual way.

The pressure released washing medium is divided into two streams. One-half is recycled directly into the washing column and delivered to its middle section. The other half is heated to 100° C., thereby stripped with 1,000 Nm.³/h. of pure gas and thus freed of hydrogen sulfide up to a residual content of 2.5 Nm.³/m.³. This part stream goes back to the head of the column. The stripping gas is delivered to the crude gas over a recompressor.

Tri-n-butylphosphate is in the condition: at one atmosphere at 20° C. 20.9 Nm.³, at 40° C. 12.9 Nm.³, at 60° C. 9.4 Nm.³ and at 80° C. 6.5 Nm.³ of hydrogen sulfide per cubic meter to be dissolved. The corresponding Bunsen's absorption coefficients amount for carbon dioxide to 2.6; 1.7; 1.2 and 1.0 and for methane 0.41; 0.37; 0.35 and 0.34. Thereby arises an absorption ratio for $H_2S:CO_2$ at 20° C. of 8.2:1, at 40° C. of 7.6:1, at 60° C. of 8.0:1 and at 80° C. of 6.7:1 and for $H_2S:CH_4$ at 20° C. of 51:1, at 40° C. of 35:1, at 60° C. of 27:1 and at 80° C. of 19:1.

*Example 2*

25,000 Nm.³/h. of dried crude gas under a pressure of 60 atmospheres excess pressure with 4% by volume of hydrogen sulfide, 70% by volume of methane, 20% by volume of carbon dioxide and the remainder nitrogen were washed in countercurrent relationship at a pressure of about 60 atmospheres excess pressure and a temperature of preferably 20° C. to 40° C. with 55 cubic meters per hour of tri-n-butylphosphate and freed of hydrogen sulfide up to a residual content of 0.22% by volume.

The loaded washing medium is subjected to pressure release to atmospheric pressure in a pressure release column. The thereby resulting pressure released gas contains about 36% by volume of hydrogen sulfide, 37% by volume of carbon dioxide and 27% by volume of methane and can be subsequently processed in a Claus unit to elemental sulfur.

The regenerated washing medium from the pressure release goes back to the head of the washing column.

*Example 3*

25,000 Nm.³/h. of dried crude gas under a pressure of 60 atmospheres excess pressure with 15% by volume of hydrogen sulfide, 69% by volume of methane, 10% by volume of carbon dioxide and the remainder nitrogen were washed in countercurrent relationship at a pressure of about 60 atmospheres excess pressure and a temperature of preferably 20° C. to 40° C. with 40 cubic meters per hour of tri-n-propylphosphate and freed of hydrogen sulfide up to a residual content of 0.24% by volume.

The loaded washing medium is subjected to pressure release to atmospheric pressure in a pressure release column. The thereby resulting pressure released gas contains 86% by volume of hydrogen sulfide, 6% by volume of carbon dioxide and 8% by volume of methane and can be subsequently processed to elemental sulfur in a Claus unit.

The regenerated washing medium from the pressure release goes back to the head of the washing column.

Tri-n-propylphosphate dissolves at one atmosphere excess pressure at 20° C. 25.0 Nm.³, at 40° C. 14.0 Nm.³, at 60° C. 8.0 Nm.³ and at 80° C. 6.3 Nm.³ of hydrogen sulfide per cubic meter. The corresponding Bunsen's absorption coefficients amount for carbon dioxide to 1.35; 1.11; 0.87 and 0.64 and for methane to 0.31; 0.22; 0.18 and 0.17. Therefrom arises the absorption ratio for $H_2S:CO_2$ at 20° C. of 18.5:1; at 40° C. of 12.6:1; at 60° C. of 9.2:1 and at 80° C. of 9.8:1 and for $H_2S:CH_4$ at 20° C. of 81:1; at 40° C. of 64:1; at 60° C. of 44:1 and at 80° C. of 38:1.

*Example 4*

25,000 Nm.³/h. of dried crude gas under a pressure of 60 atmospheres excess pressure with 4.0% by volume of hydrogen sulfide, 70.0% by volume of methane, 20.0% by volume of carbon dioxide and the remainder nitrogen were washed in countercurrent relationship at a pressure of about 60 atmospheres excess pressure and a temperature of preferably 20° C. to 40° C. with 50 cubic meters per hour of tri-n-propylphosphate and freed of hydrogen sulfide up to a residual content of 0.21% by volume.

The loaded washing medium is subjected to pressure release to atmospheric pressure in a pressure release column. The thereby resulting pressure released gas contains 47% by volume of hydrogen sulfide, 32% by volume of carbon dioxide and 21% by volume of methane and can be subsequently processed to elemental sulfur in a Claus unit.

The regenerated washing medium from the pressure release goes back to the head of the washing column.

*Example 5*

25,000 Nm.³/h. of dried crude gas under a pressure of 60 atmospheres excess pressure with 4.0% by volume of hydrogen sulfide, 70.0% by volume of methane, 20.0% by volume of carbon dioxide and the remainder nitrogen were washed in countercurrent relationship at a pressure of about 60 atmospheres excess pressure and a temperature of preferably 20° C. to 40° C. with 70 cubic meters per hour of tri-n-butylphosphate and freed of hydrogen sulfide up to a content of 0.21% by volume.

The loaded washing medium is subjected to pressure release in two stages from 60 to 20 atmospheres excess pressure and from 20 atmospheres excess pressure to atmospheric pressure. In the first pressure release stage of hydrogen sulfide lean gas with 58% by volume of methane and 42% by volume of carbon dioxide is obtained which is to be used as the heated gas but also can be added to the pure gas. The acid gas of the second pressure release stage contains 56% by volume of hydrogen sulfide and 38% by volume of carbon dioxide with the remainder methane and can be further processed to elemental sulfur in a Claus unit.

The regenerated washing medium from the second pressure release stage goes back to the head of the washing column.

*Example 6*

25,000 Nm.³/h. of dried crude gas under a pressure of 60 atmospheres excess pressure with 4.0% by volume of hydrogen sulfide, 70.0% by volume of methane, 20.0% by volume of carbon dioxide and the remainder nitrogen are washed in countercurrent relationship at a pressure of about 60 atmospheres excess pressure and a temperature of preferably 20° C. to 40° C. with 66 cubic meters per hour of tri-n-propylphosphate and freed of hydrogen sulfide up to a content of 0.21% by volume.

The loaded washing medium is subjected to pressure release in two stages from 60 to 20 atmospheres excess pressure and from 20 atmospheres excess pressure to atmospheric pressure. In the first pressure release stage there is obtained a hydrogen sulfide lean gas with 51% by volume of methane and 49% by volume of carbon dioxide which is to be used as the heated gas but can also be added to the pure gas. The acid gas from the second pressure release stage contains 70% by volume of hydrogen sulfide and 27% by volume of carbon dioxide with the remainder methane and can be further processed to elemental sulfur in a Claus unit.

The regenerated washing medium from the second stage pressure release goes back to the head of the washing column.

What is claimed is:

1. A process for the removal of hydrogen sulfide from natural gas and other hydrocarbon-containing gases which comprises subjecting such gases to a pressure wash with a trialkylphosphoric acid ester washing medium at a temperature ranging from room temperature to about 40° C. and regenerating the washing medium by pressure release.

2. A process according to claim 1, in which the trialkylphosphoric acid ester has 1 to 5 carbon atoms in its alkyl group.

3. A process according to claim 1, in which the trialkylphosphoric acid ester is tri-n-propylphosphate.

4. A process according to claim 1, in which the trialkylphosphoric acid ester is tri-n-butylphosphate.

5. A process for the removal of hydrogen sulfide from natural gas and other hydrocarbon-containing gases which comprises subjecting such gases to a pressure wash with a trialkylphosphoric acid ester washing medium at a temperature ranging from room temperature to about 40° C. and regenerating the washing medium by pressure release in two stages.

6. A process for the removal of hydrogen sulfide from natural gas and other hydrocarbon-containing gases which comprises subjecting such gases to a pressure wash with a trialkylphosphoric acid ester washing medium at a temperature ranging from room temperature to about 40° C. and regenerating the washing medium by pressure release and heating to about 50° C. to 150° C.

7. A process for the removal of hydrogen sulfide from natural gas and other hydrocarbon-containing gases which comprises subjecting such gases to a pressure wash with a trialkylphosphoric acid ester washing medium at a temperature ranging from room temperature to about 40° C. and regenerating the washing medium by pressure release and heating to about 50° C. to 150° C. and simultaneously stripping with an inert gas.

8. A process for the removal of hydrogen sulfide from natural gas and other hydrocarbon-containing gases which comprises subjecting such gases to a pressure wash with a trialkylphosphoric acid ester washing medium at a temperature ranging from room temperature to about 40° C. and regenerating the washing medium by pressure release and heating to about 50° C. to 150° C. and simultaneously stripping with pure gas.

9. A process for the removal of hydrogen sulfide from natural gas and other hydrocarbon-containing gases which comprises subjecting such gases to a pressure wash with a trialkylphosphoric acid ester washing medium at a temperature ranging from room temperature to about 40° C. and regenerating the washing medium by pressure release, the thus purified gas being desulfurized to a low hydrogen sulfide content of the order of 2 p.p.m. by volume.

10. A process for the removal of hydrogen sulfide from natural gas and other hydrocarbon-containing gases which comprises subjecting such gases to a pressure wash with a trialkylphosphoric acid ester washing medium at a temperature ranging from room temperature to about 40° C. and regenerating the washing medium by pressure release, the gas being treated and the washing medium being in countercurrent flow relationship to one another.

11. A process for the removal of hydrogen sulfide from natural gas and other hydrocarbon-containing gases which comprises subjecting such gases to a pressure wash with a trialkylphosphoric acid ester washing medium at a temperature ranging from room temperature to about 40° C. and regenerating the washing medium by pressure release, the thus purified gas being desulfurized to a low hydrogen sulfide content of the order of 2 p.p.m. by volume by a molecular sieve having a pore diameter of 5 A.

12. A process according to claim 1, in which the pressure wash is carried out under a pressure of about 60 atmospheres excess pressure.

References Cited

UNITED STATES PATENTS

| | | | |
|---|---|---|---|
| 2,580,622 | 1/1952 | Vogt et al. | 55—64 |
| 2,623,611 | 12/1952 | Levine et al. | 55—64 |
| 3,078,634 | 2/1963 | Milton | 55—73 |
| 3,139,324 | 6/1964 | Housset | 55—73 |
| 3,193,986 | 7/1965 | Forster | 55—43 |
| 3,225,519 | 12/1965 | Stotler | 55—48 |

REUBEN FRIEDMAN, *Primary Examiner.*

C. N. HART, *Assistant Examiner.*